US012576416B2

(12) United States Patent
Bennett et al.

(10) Patent No.: US 12,576,416 B2
(45) Date of Patent: Mar. 17, 2026

(54) INTELLIGENT MARKING PAINT APPLICATOR SYSTEM AND METHOD OF USE

(71) Applicant: Tanbry Holdings, LLC, Gardnerville, NV (US)

(72) Inventors: Michael Joseph Bennett, Genoa, NV (US); Mark David Williams, Gardnerville, NV (US)

(73) Assignee: Tanbry Holdings, LLC, Gardnerville, NV (US)

( * ) Notice: Subject to any disclaimer, the term of this patent is extended or adjusted under 35 U.S.C. 154(b) by 0 days.

(21) Appl. No.: 19/204,259

(22) Filed: May 9, 2025

(65) Prior Publication Data

US 2025/0269393 A1 Aug. 28, 2025

Related U.S. Application Data

(63) Continuation of application No. 18/737,480, filed on Jun. 7, 2024.

(60) Provisional application No. 63/471,585, filed on Jun. 7, 2023.

(51) Int. Cl.

| | |
|---|---|
| ***B05B 12/00*** | (2018.01) |
| ***B05B 9/00*** | (2006.01) |
| ***B05C 17/005*** | (2006.01) |
| ***B65D 83/184*** | (2025.01) |
| *E01C 23/22* | (2006.01) |

(52) U.S. Cl.

CPC ............ *B05B 12/004* (2013.01); *B05B 9/007* (2013.01); *B05C 17/0052* (2013.01); *B65D 83/184* (2025.01); *E01C 23/227* (2013.01)

(58) Field of Classification Search

CPC ..... B05B 12/004; B05B 9/007; B65D 83/184; B05C 17/0052

See application file for complete search history.

(56) References Cited

U.S. PATENT DOCUMENTS

| | | | |
|---|---|---|---|
| 2010/0090700 A1 | 4/2010 | Nielsen et al. | |
| 2010/0205032 A1 | 8/2010 | Nielsen et al. | |
| 2011/0045175 A1 | 2/2011 | Nielsen et al. | |
| 2012/0069178 A1 | 3/2012 | Nielsen et al. | |
| 2012/0113244 A1* | 5/2012 | Nielsen | G06T 7/90 348/82 |

* cited by examiner

*Primary Examiner* — Nathan T Leong

(74) *Attorney, Agent, or Firm* — Holland & Hart LLP

(57) ABSTRACT

An intelligent marking paint applicator system and method of use. The applicator, such as a marking stick or gun for example, can include a composition marking applicator and associated electrical and electronic components mounted in or in association with the device to identify and record composition (such as spray paint for example) marking activity. The device may optionally include GPS locating sensing capability to identify the location of the composition marking activity. The device may optionally provide marking activity to one or more separate devices, including in order to identify the location of the composition marking activity. Some embodiments of the applicator can also be lightweight, compact, and economical—in some embodiments, relying on use of the device with one or more other separate smart devices to provide geolocation of device for example.

12 Claims, 15 Drawing Sheets

INTELLIGENT MARKING PAINT APPLICATOR SYSTEM AND METHOD OF USE

CROSS-REFERENCE TO RELATED APPLICATION

This U.S. Non-Provisional Patent Application is a continuation of Applicant's prior U.S. Non-Provisional Patent Application entitled INTELLIGENT MARKING PAINT APPLICATOR SYSTEM AND METHOD OF USE, filed Jun. 7, 2024, Ser. No. 18/737,480, which claims priority to the Applicant's prior U.S. Provisional Patent Application entitled UTILITY MARKING APPARATUS, SYSTEM, AND METHOD OF USE, filed Jun. 7, 2023, Ser. No. 63/471,585, which prior Applications are incorporated herein by reference except that, in the event of any inconsistency between any such prior Applications, this Non-Provisional Patent Application shall govern.

FIELD OF THE INVENTION

This specification relates to an intelligent marking paint applicator system and methods that provide information, and to, for example, an applicator that provides motion related information to one or more separate smart systems or applications, in some embodiments wirelessly and/or in cooperation with an air mouse emulator or other motion sensing system.

BACKGROUND OF SOME ASPECTS OF THIS SPECIFICATION

There are many applications for use and tracking of marking of and tracking of geolocations. For example, a significant amount of infrastructure is buried close to the ground's surface. For example, the United States is host to over 20 million miles of underground pipe and cable, and more is added every day. Identifying the location of such infrastructure is critical to ongoing construction, maintenance, and other activities; yet the existing system and methods for achieving such identification are a long way from optimal.

In this regard, the process of locating and marking underground utilities has been an ongoing practice for many years in many but not all locales, and the current state-of-the-art in the underground utility locating activity and apparatus is expensive and relatively complex. It typically includes the use of a dedicated RF and/or RFID applicator with built-in Survey Grade GNSS GPS receivers and cell or satellite radios. The radios are used to transmit utility pipe or cable location information to a central database. This data can be stored in many ways for future recall to support the construction industry or the national One-Call, call-before-you-dig, phone number (811).

In a routine underground utility marking and finding activity some type of utility detection equipment is used in conjunction with a marking paint applicator. Because of the high cost and complexity of utility detection equipment with on-board GNSS and 4G LTE or Satellite communication capability, location data is not always recorded unless a secondary GPS data recording device is used in a supplemental operation entirely separate and distinct from a marking paint applicator device and method of use such a device.

Thus, while utility marking spray paint tools are commonly used to physically mark the locations with particular paint color indicating the utility type, they typically are either not adapted to detect and provide marking location data for later reference and use or, when so adapted, are complex, costly, and more weighty marking devices that, for example, include GPS data locating and recording apparatus and related hardware and software, such as onboard smart computing capability, a graphic display and various sensors that can be combined to provide a specific function. They typically become obsolete at a much faster pace because the smart device industry advances in processing power, display capability and communication capability rapidly.

Further, most commonly, utility marking personnel are sent out to locations to mark the pre-specified utility location, and the resulting paint marking is often unsightly and diminished in visibility through wear and tear over time. In addition, there is often no independent record of the location of the marking other than the physical marking at the location itself.

In the meantime, the Internet and Internet of Things ("IoT") has developed. IoT devices have become ubiquitous, such as smartphones and great numbers of other smart devices from personal computers and laptops to automated engines, vehicles, robots, drones, ovens, refrigerators, washers, dryers, and HVAC systems as but some of a great many examples that are in common and growing use today. In this regard, a wide variety of smart objects embedded with one or more sensors, software, and network connectivity, allows them to collect and share data with other smart devices to provide robust information, data processing and graphic representations as well as provide a connection to the world wide web for many diverse applications. Thus, these various automated "Things" can be utilized to provide functions for yet other apparatus or devices.

And also in the meantime, the opportunities to make advantageous use of location information are constantly growing, such as, for example, identifying location of inventory, livestock, plants, vehicles, and myriad other things and activities.

BRIEF SUMMARY OF SOME NOVEL ASPECTS OF THIS SPECIFICATION

The inventors believe they have discovered at least some of the issues identified above or their severity. The inventors have therefore developed various embodiments of an inteligent marking paint applicator apparatus to provide an effective way to identify and record underground utility and other location and data as well as optionally to relocate previously identified locations. In some embodiments, the applicator can provide a simple, hand-held or hand-controlled, lightweight, and/or cost-effective system for accomplishing such identification and recording.

In some applications, the applicator can be used by, for example, a utility company or an inventory management group for "record-track-verification" auditing functions. Additionally, a location that was previously identified and/or marked with the aid of the applicator apparatus and method of use could be located and/or re-marked without the use of further location equipment other than accessing the location data previously recorded with use of the applicator.

In some applications, the data acquired by the applicator can also be used to supply geo visualization or tracking programs running on one or more of smart phones, tablets, or computer systems for legacy or other two-dimensional or other mapping or information tracking applications. In some embodiments, the applicator can be a marking stick or other marking apparatus, such as a marking gun for example, that can provide a data transfer interface, such as via a wireless or USB protocol interface in some applications, to collect and transmit applicator activity, physical GPS location, and/or paint color data.

In some applications, an applicator can provide applicator activity information to a remote device that can utilize the activity information to generate, for example, GPS location information for the activity information and, in some instances, thus eliminate need and cost for GPS location technology, such as a GPS receiver, recording, or transmission system, on the applicator.

In some embodiments, a applicator apparatus can provide at least one or more of the following:

1. a low-cost microcontroller-based (e.g., SOIC and battery powered) system located on the applicator apparatus, optionally in a handle of the applicator, to monitor applicator or applicator trigger actuation and relay or transmit actuation activity to: (i) a separate smart system, for the smart system to identify and record the geolocation of the actuation with the separate smart system; and/or (ii) local storage or memory on the applicator, which may be, in some applications, a USB drive removably in communication with the applicator;
2. a paint color sensor that can read a color swatch band on a marking paint can label or an RFID or other identification transponder or identification mechanism that can be used to read an RFID or other identification tag located on a marking paint can or other paint container or identification mechanism;
3. a wireless protocol interface for data communication with an external device, such as, for example, a smartphone or dedicated or other GPS recording device; in some embodiments, the wireless protocol may be Bluetooth Low Energy ("BLE");
4. an optional, optionally GNSS Grade, GPS module can be included on or in communication with the applicator as well; with either of options 1 or 4, the applicator apparatus can then be used to collect, for example, data including underground utility or other GPS location information and, in some applications, with a cost-effective, simple, and easily portable applicator. In applicator sticks having composition marking, such as paint marking for example, capability, such data can be used to verify the correct marking and remarking of one or more previously processed locations, such as for example utility sites and/or to add to a global or other database of underground utility types and locations;
5. an optional air mouse emulator or position system on or in association with the applicator apparatus, to monitor and output information regarding motion of the applicator apparatus.
6. a portable hand-held or hand-drive marking stick or marking gun applicator, which can, in some instances, be lightweight, compact, and easily manipulated, including, in some embodiments by use of a rotatable support wheel and guide.

In some instances, the current applicator can be an IoT device by using the processing power, display capability and/or wireless connectivity of modern smart devices while adding one or more sensors to applicator apparatus, such as spray paint applicators for example, that would generate and provide data useful in industries that utilize such apparatus for many different outcomes. In some embodiments, particularly those relying on processing power and features such as GPS location technology in remote devices not on the applicator apparatus, the applicator apparatus provide a low-cost solution that can achieve the same and often a better result than an autonomous high-cost device can provide. In some applications, the applicator apparatus uses an industry standard RF protocol for interfacing to outside smart devices, so that, in certain instances, developers have an easier path to developing applications that can utilize the capabilities of the applicator apparatus.

There are other novel features and advantages of the present specification. They will become apparent as the specification proceeds. In this regard, the scope of the invention is to be determined by the scope of the claims as issued and not by whether a feature is recited in the Background above or this Summary.

BRIEF EXPLANATION OF THE DRAWINGS OF THIS SPECIFICATION

The Inventors' preferred and other embodiments are disclosed in association with the following Figures, where:

DETAILED DESCRIPTION

This Detailed Description sets forth examples of embodiments and other aspects of this Specification. It is not to be construed as limiting, and similarly it is to be understood that the disclosed hardware and software components may be mixed and matched in differing ways than those expressly set forth in this Detailed Description.

Figure 1A:
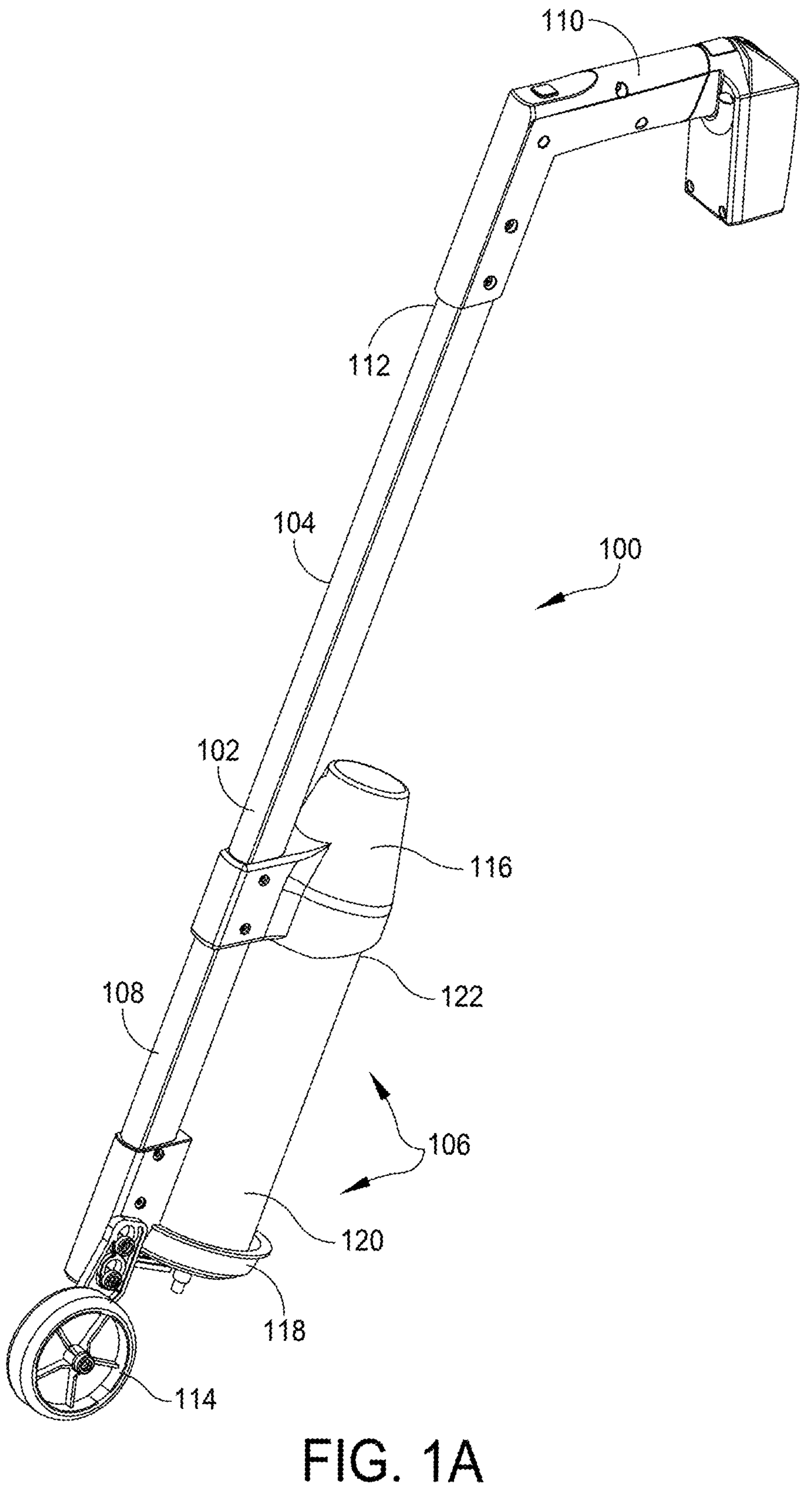
FIG. 1A is a perspective view of a portable marking stick applicator embodiment with a paint can cartridge mounted in a paint can cartridge mount on the marking stick.

With reference now to FIG. 1A, a marking stick embodiment, generally 100, has: (i) a central laterally extending stick section 102 mounted to a marking stick body section 104, (ii) a paint can cartridge mount 106 mounted to a lower end section 108 on the central stick section 102; (iii) a handle section 110 mounted to the upper end section 112 of the central stick section 102; and (iv) a roller wheel 114 mounted to the lower end section 116 of the central stick section 102 and during use of the marking stick 100 bearing weight of the marking stick 100 and providing an aid for the user to guide the movement of the marking stick 100 along a surface (not shown in FIG. 1A) on which the roller wheel 114 may roll. The paint can cartridge mount 106 has an upper frusto-conical cap 116 spaced from a lower cartridge retaining ring 118, so that a paint can cartridge 120 can be securely mounted between upper frusto-conical cap 116 and lower cartridge retaining ring 118 with the upper frusto-conical cap 116 gripping and surrounding the upper cylindrical end 122 of the paint can cartridge 120 and the lower cartridge retaining ring 118 gripping and surrounding the lower cylindrical end 124 of the paint can cartridge 120.

Figure 1B:
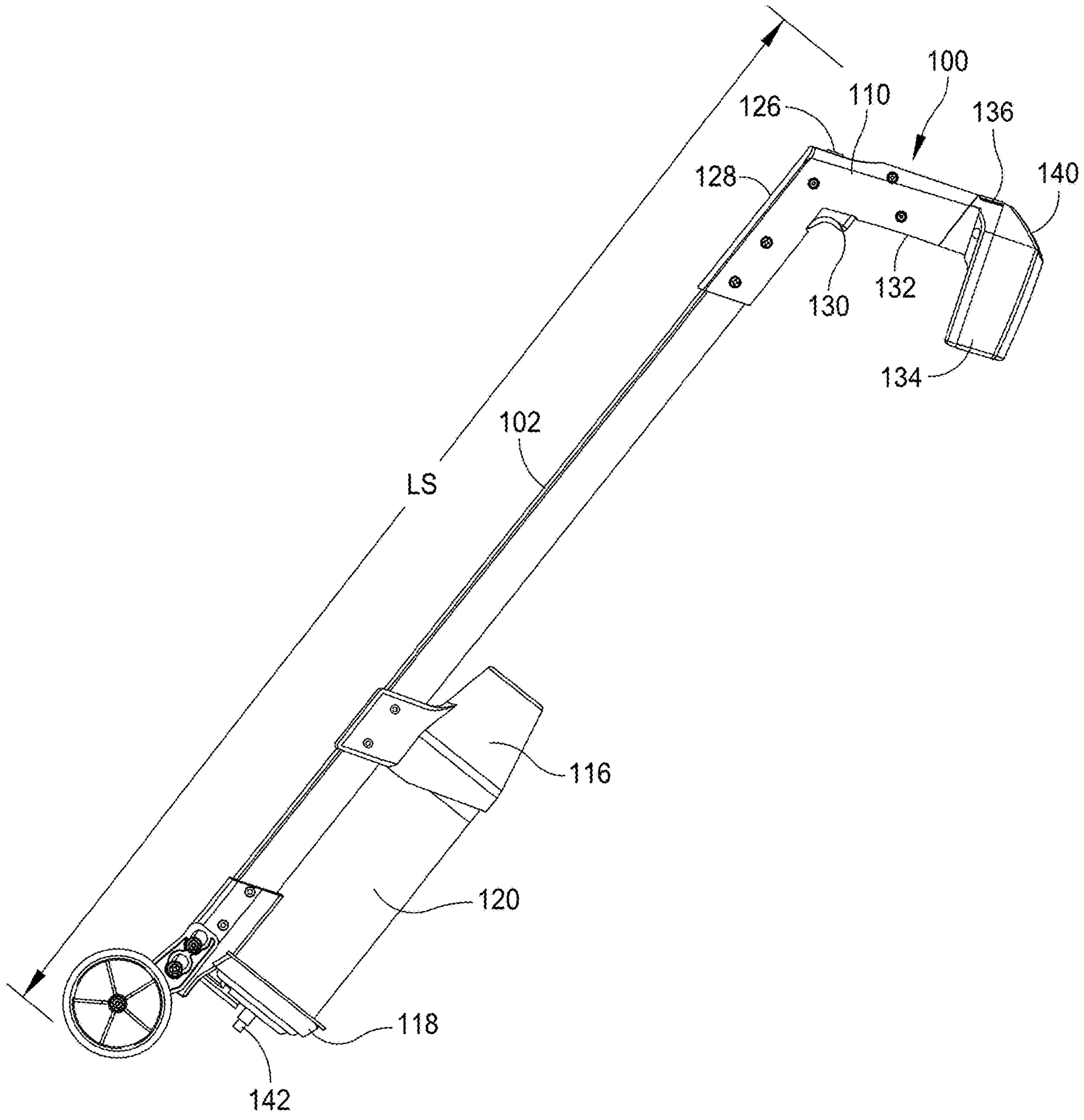
FIG. 1B is a side view of the marking stick with the paint can cartridge of FIG. 1A.

With reference to FIG. 1B, the handle section 110 of the marking stick 100 has a power button 126 on the handle section's upper end 128, a trigger switch 130 on the handle section's lower end 132, a removable battery pack 134 extending from the handle section 110 opposite the trigger switch 130. The battery pack 134 has a battery pack release button 136 on the battery pack's upper end 138, and a charging input port 140 spaced from the battery pack release button 136. The lower cartridge retaining ring 118 has a spray tip aperture (not shown in FIG. 1B) through which a paint can spray tip 142 extends when a paint can cartridge 120 is mounted in the paint can cartridge mount 106.

Figure 1C:
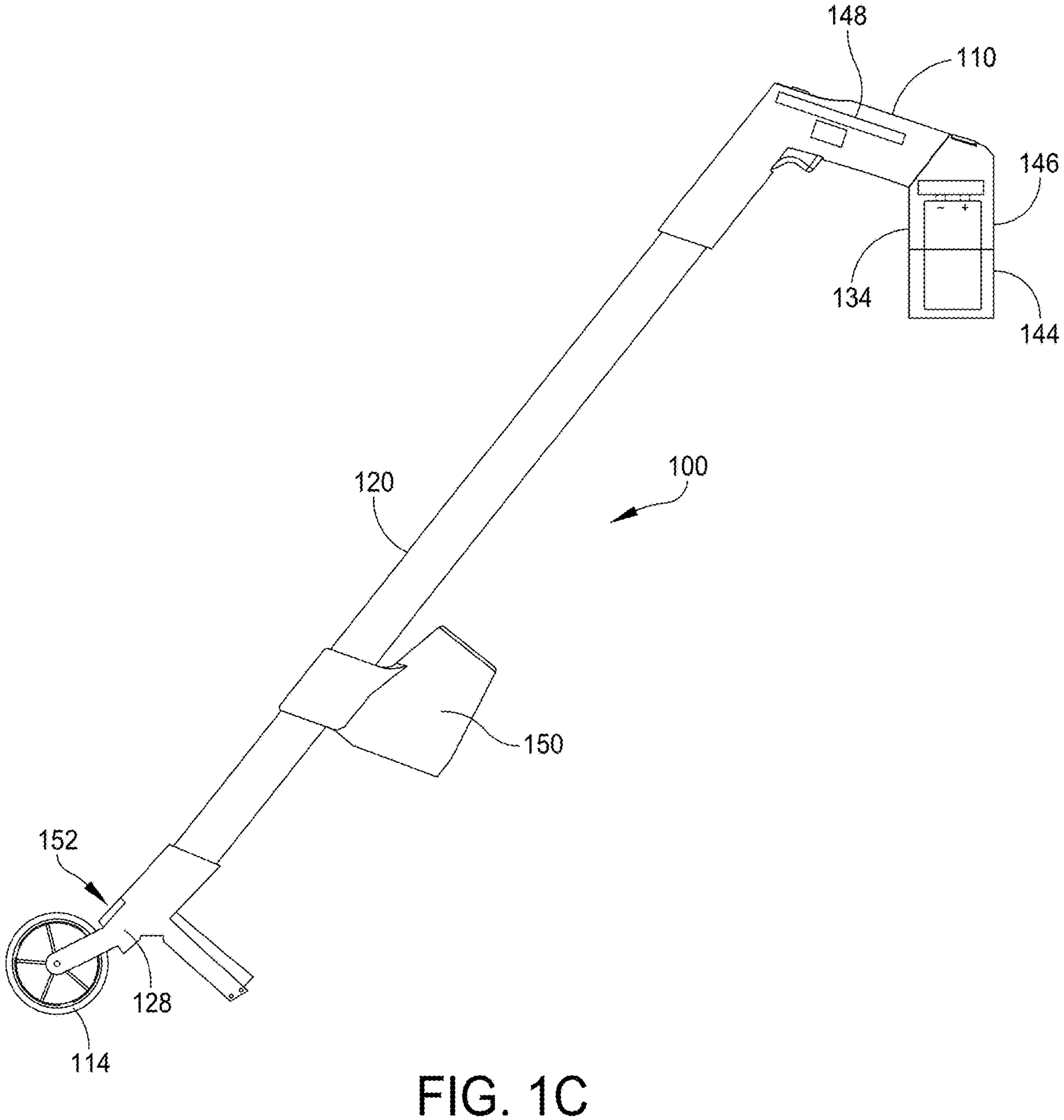
FIG. 1C is a cross-sectional view of the marking stick of FIG. 1A.

Turning now to FIG. 1C, the marking stick 100 has mounted within it (i) a 9 volt battery 144 (optionally rechargeable) and associated battery printed circuit board 146 mounted within battery pack 134, (ii) a main printed circuit board 148 mounted within the handle section 110, and an RGB color sensor 150 mounted within the upper frusto-conical cap 116, and (iii) an air mouse emulator/positional sensor system 152 mounted in the lower end section 128 of the central stick section 102 adjacent but somewhat space from the roller wheel 114.

Figure 2A:
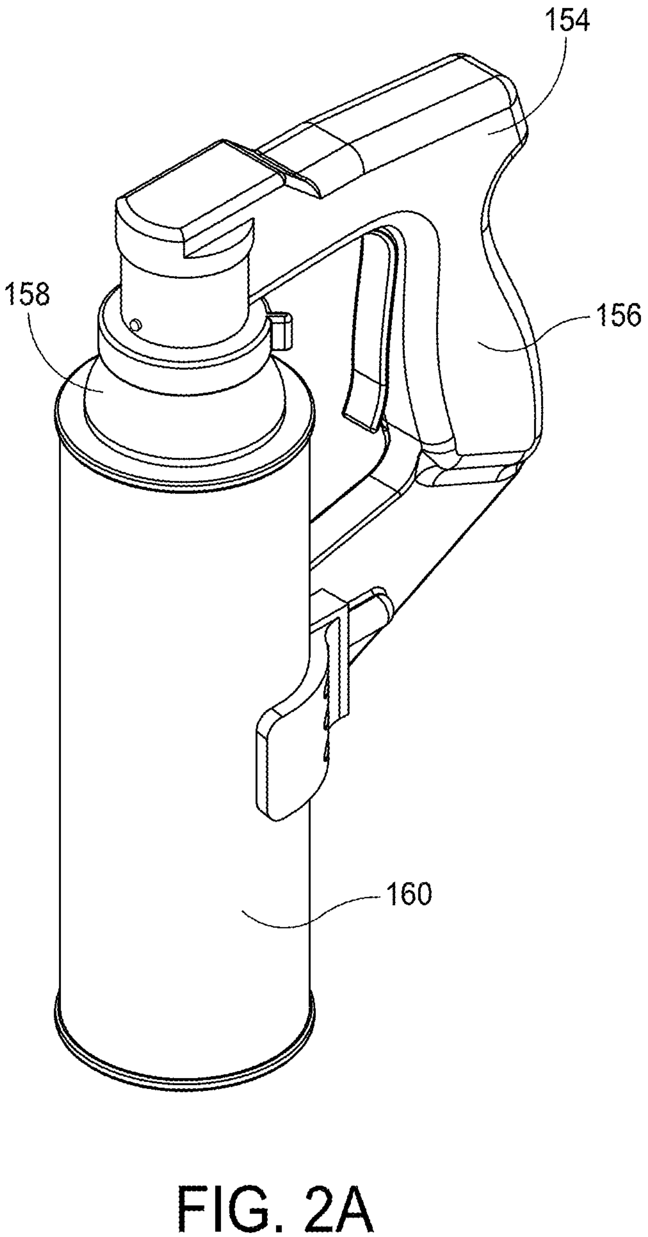
FIG. 2A is a perspective view of a portable marking gun applicator embodiment with a paint can cartridge mounted in a paint can cartridge mount on the marking gun.
Figure 2B:
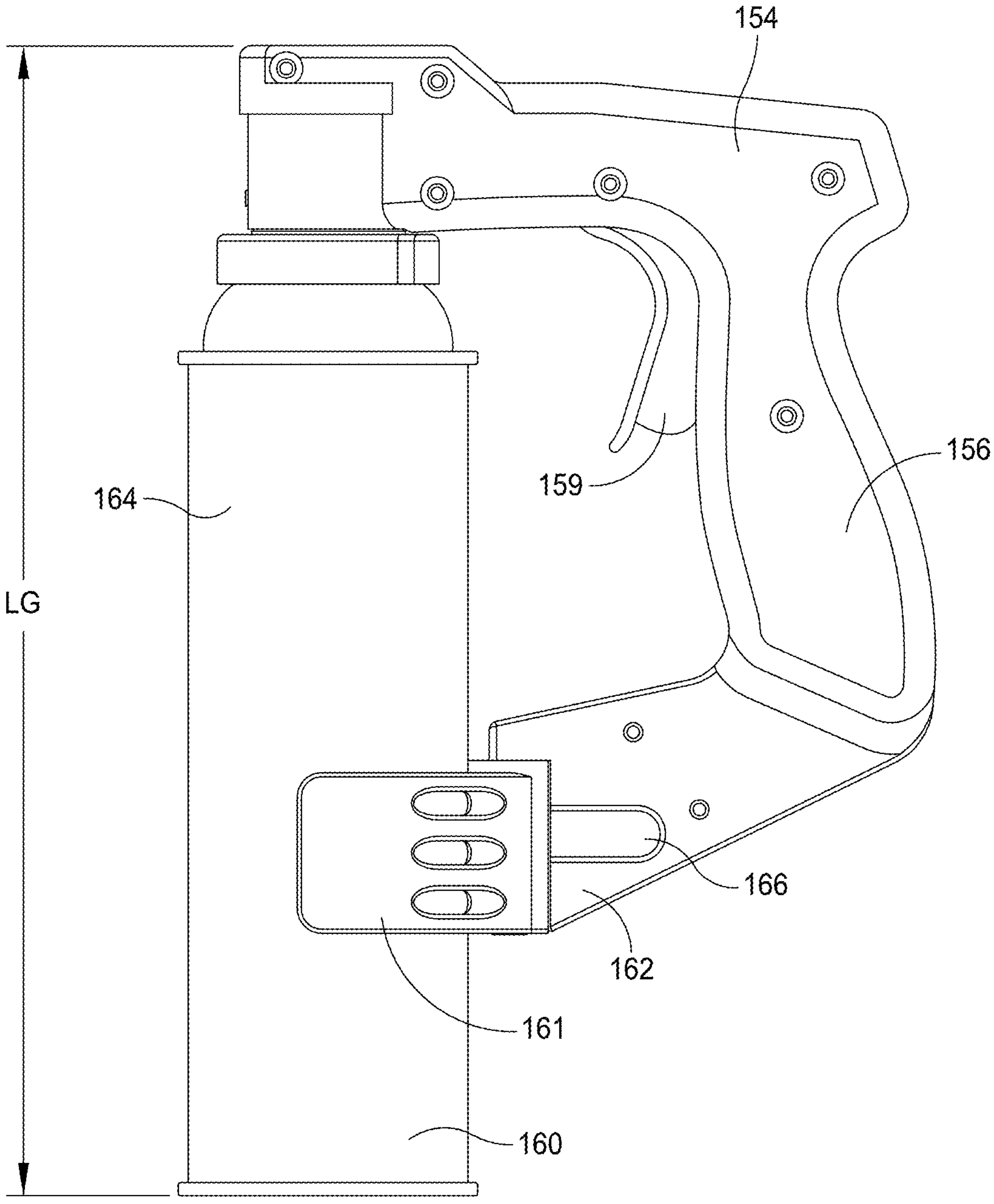
FIG. 2B is a side view of the marking gun with the paint can cartridge of FIG. 1A.

With reference to FIG. 2A, a portable marking gun 154 has a gun handle section 156 mounted to the spray paint ejection end 158 of a paint can cartridge 160 removably mounted to the gun handle section 156. Referring to FIG. 2B, the marking gun 154 has (i) a trigger 159 extending from the gun handle section 156, (ii) a semi-circular cartridge grip 161 extending from the lower end 162 of the marking gun 154 to grip the outer tubular side 164 of the paint gun cartridge 160, and (iii) an RFID and/or RGB color sensor 166 mounted in the cartridge grip 161.

Figure 2C:
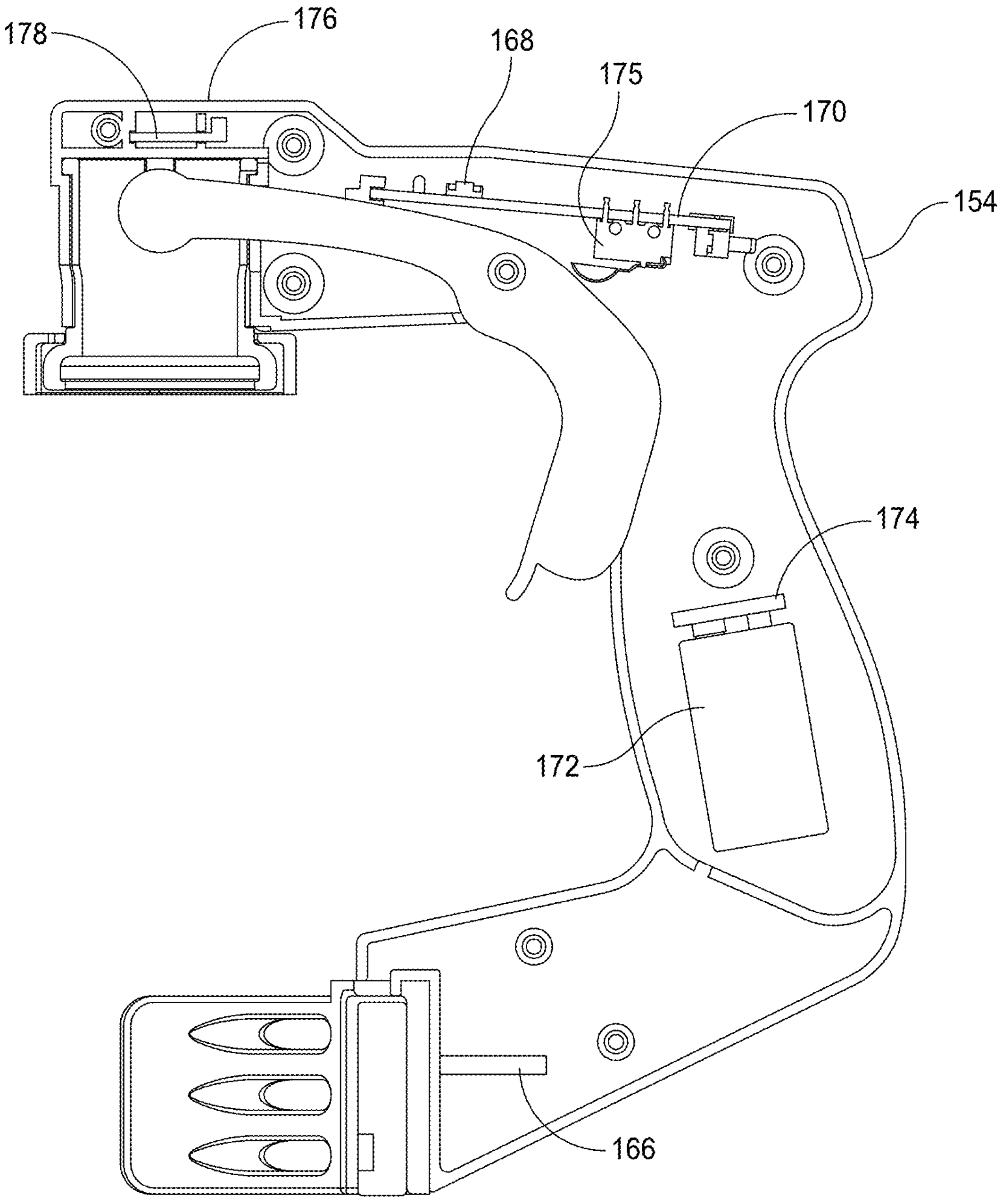
FIG. 2C is a cross-sectional view of the marking gun of FIG. 2A.

Referring to FIG. 2C, within the exterior of the marking gun 154 is mounted (i) a power switch 168, (ii) a main printed circuit board 170, (iii) a 9 volt battery (optionally rechargeable) 172 and associated battery printed circuit board 174, (iv) portions of the RFID or RGB color sensor 166, (v) a trigger switch 175, and (vi) adjacent the paint spray upper end 176 of marking gun 154 above the upper end 180 of the spray can cartridge (not shown in FIG. 2C), a motion sensor 178.

Both the FIGS. 1C and 2C embodiments include a main printed circuit board or integrated circuit ("IC"), 148 and 170 respectively. The IC can be used to interface with the various electronic elements of the electronic system and perform various functions. The IC can contain a system-on-a-chip (which integrates most or all components of a generic computing device), a bus, a microcontroller, a microprocessor, a GPU, a radio frequency interface, an antenna, a modem, an RF power supply, a general-purpose input/output ("GPIO"), one or more security measures, a memory, etc. The IC can integrate one or more of the each of the foregoing IC components (e.g., one or more antennas, zero GPUs, etc.). The foregoing components are examples of conventional IC system components that may desired by one skilled in the art to achieve the teachings of this specification. Other components not listed above may be incorporated, depending on the requirements of the specific embodiment.

Figure 3:
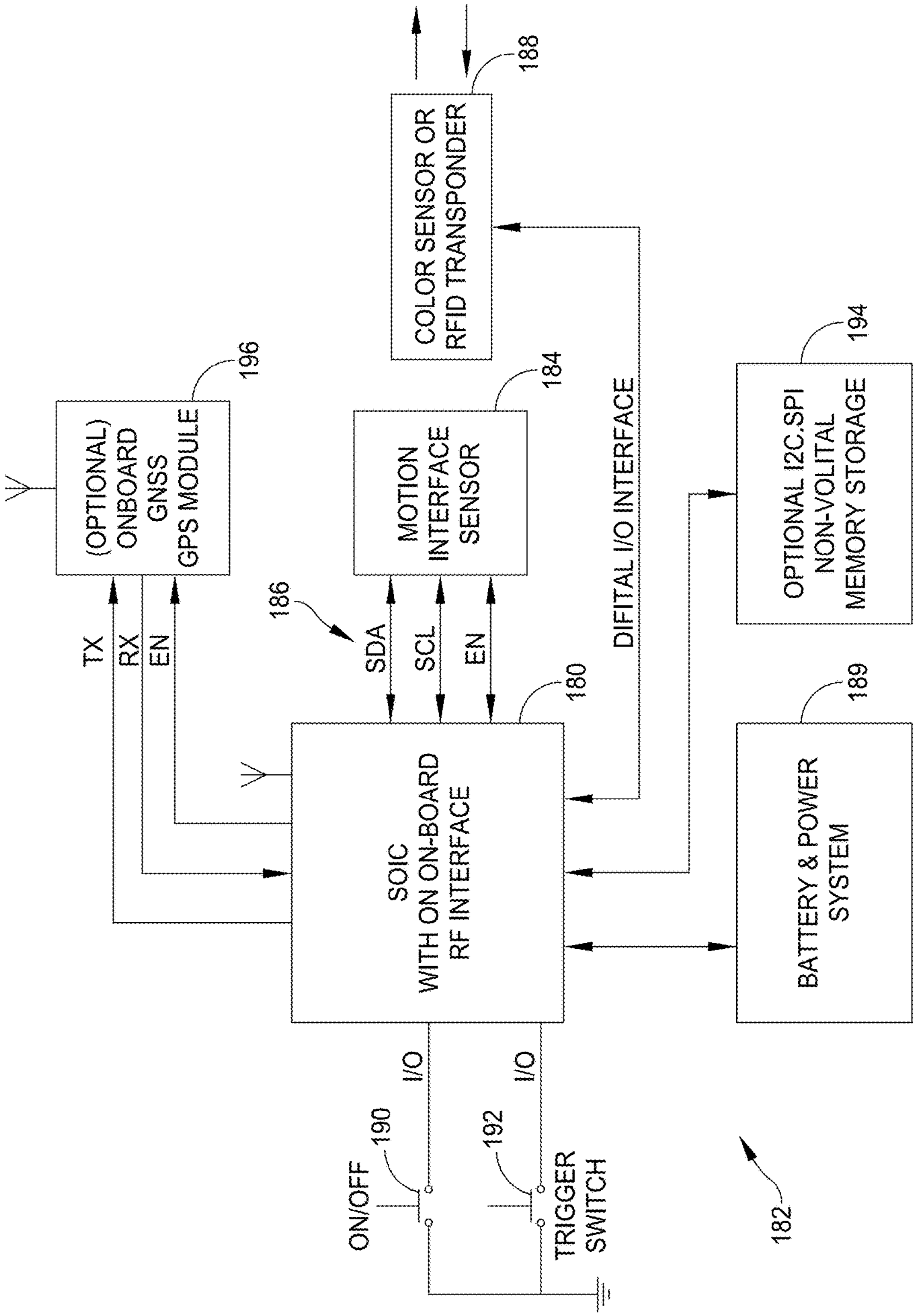
FIG. 3 is a schematic diagram of the electronic components and their interconnections within the marking stick and marking gun of FIGS. 1A and 2A.

With reference now to FIG. 3, an exemplary IC within the electronics system 182 of marking stick or gun of this Specification is a small outline integrated circuit ("SOIC") 180, but the IC may be any suitable integrated circuit in any housing such as a dual in-line package ("DIP"). An example of a suitable IC is the SI Labs BGM240P, which is described as a secure, high-performance wireless module optimized for the needs of battery and line powered IoT devices running on Bluetooth networks. Another example of a suitable IC is the Series 2 EFR32BG24 SoC, which enables Bluetooth® Low Energy connectivity, delivers RF performance and energy efficiency, Secure Vault® technology, and future-proofing capabilities. Alternatively, any similar IC could be incorporated.

The electrical system 182 includes a motion interface 184. The motion interface may include a motion tracking IC. Depending on the embodiment, the motion interface 184 includes one or more motion sensors and may include other ancillary electronic components such as communication circuitry, etc. The motion sensors 184 may be an accelerometer, gyroscope, or any other sensor capable of providing data in which motion and orientation can be deduced. The motion sensor 184 can be used to capture marking strokes. Actuations of the marking trigger may activate the motion sensor(s), which will then sense, record, and/or transmit motion sensor data to the IC or another appropriate receiving device (e.g., a computing device, a database, etc.). A timer (within the motion interface, the IC, or other computing device) may be used to keep track of marking trigger depression time. In some embodiments incorporating a motion interface, the motion interface can include a 3-dimensional motion tracking IC with one or more accelerometers and one or more gyroscopes to collect x, y and z positional data over time, suitable to being stored in a 3-dimensional array. In some embodiments, the collected motion sensor data can be translated to a script or facsimile as it is marked at the site with the marking stick or gun by creating a digital recording of the marking activity. In an optional embodiment, activation of the trigger switch can be recorded as a "mouse click" with further movement of the motion sensor sensed and recorded as PC Mouse x, y, and or z movements, thus recording the spray strokes. This function could optionally be provided by inclusion or association of the stick or gun with an Air Mouse. Air Mouse are well known in the prior art.

In the embodiment of FIG. 3, the motion interface sensor 184 is in communication with the IC via an I2C protocol 186, but any suitable wired or wireless communication protocol can be used. The I2C protocol 186 as implemented involves SCL, SDA, and EN connections, but other connections may exist. SCL is a serial clock primarily controlled by the SOIC controller device. SCL is used to synchronously clock data in or out of the target device, e.g., the motion interface sensor 184. SDA is the serial data connection. SDA is used to transmit data to or from the target device. EN is the enablement connection. For example, EN allows the IC to enable the motion interface 184 (e.g., initiate communication between the IC and motion interface).

The electrical system 182 may include a color identification module 188. Within the color identification module, an RGB sensor and/or an RFID transponder can be used to collect color sensor data and determine the presence of a spray can and the color of the paint being applied. The color identification module 188 can communicate color sensor data, RFID information, or any other relevant signals from the color identification module to the IC via any appropriate communication circuitry or protocol (e.g., a digital interface on the IC, a hardwired connection, I2C, UART, SPI, etc.).

Using the RGB sensor within the color identification module 188, a paint swatch (e.g., on an associated paint can cartridge label) can be sensed to determine a paint color. An example of a suitable RGB sensor is the TCS3472 sensor, which provides a digital return of red, green, blue (RGB), and clear light sensing values. The TCS3472 sensor includes an IR blocking filter integrated on-chip and is localized to the color sensing photodiodes, minimizes the IR spectral component of the incoming light, and allows color measurements to be made accurately and precisely. The high sensitivity, wide dynamic range, and IR blocking filter make the TCS3472 a suitable color sensor solution for use under varying lighting conditions and through attenuating materials. The color sensor data or signal can be sent to the IC, such as SOIC 180, to process, store, or transmit as required by the specific embodiment. In some embodiments, the color sensor data or signal is sent directly to a computing device or to a database.

An RFID transponder within the color identification module 188 can read an RFID tag (e.g., on an associated paint can cartridge) to determine a paint color. An example of an RFID Transponder is the Texas Instruments RF430FRL154H NFC ISO15693 Sensor Transponder with an SPI/I2C interface.

The electrical system 182 can include a power system 189. The power system 189 can include a battery and any battery management system electronics. A battery pack, such as four rechargeable batteries in a serial configuration, can be used. The exact power supply configuration will can vary, however, according to the specific embodiment and its respective system components (e.g., the sensors, the IC, physical structure, etc.).

The electrical system 182 may include an input/output ("IO") interface that can interface internal and external signals. In the embodiment of FIG. 3, the IO interface system includes a power button 190 that turns the electronic system on and off. The electrical system 182 can include a trigger switch 192 that, when pulled, actuates, as shown and described in associated with FIGS. 1A through 2C, the spray cartridge tip to release paint and actuates the IC (or other appropriate component/device) to record a trigger pull and a duration of the trigger pull on the marking stick or gun as applicable.

The electrical system 182 can include a memory 194. The memory 194 may be RAM memory, flash memory, ROM memory, a EPROM memory, EEPROM memory, registers, a hard disk, a removable disk, a CD-ROM, a USB drive, or any other form of computer-readable storage medium known in the art. The memory 194 can be incorporated for local storage of sensor data, meta data, software instructions, and other device activity.

The electrical system 182 can optionally include a navigation module 196. A navigation module 196 can include a GPS module. A GPS module can be an all-in-one digital receiver that, from satellite signals, calculates the distance of a satellite and provides location data for the GPS module. In some embodiments, the navigation module can be GNSS grade to facilitate compatibility with navigational satellites from other networks beyond the GPS network, and thus improve receiver accuracy and reliability with more available satellites.

In some embodiments, navigation module 196 is not contained within or mounted to an associated marking stick or gun but is instead provided by a separate smart computing device in communication with the marking stick or gun. Such a separate navigation module 196 can provide the functions of an internally located navigation module (e.g., collecting location data for a custom application designed for the marking stick). Using a separate smart device can be particularly advantageous by allowing integration of such a navigation module 196 from a separate smart device while rendering the present marking stick or gun relatively simpler, lighter, and less costly.

In the system embodiment 182 of FIG. 3 having the optional onboard navigation module 196, a UART communication protocol is employed to transfer data between the navigation module and the IC, but any other wired or wireless communication protocol may be employed. Connections TX, RX, and EN are shown, but other connections and combinations may be used as necessary. The TX pin sends out (transmits) the digital signal, and the RX pin listens for (receives) a digital signal. EN is the enablement connection. EN allows the IC to enable (e.g., initiate communication between the IC and GPS module) the navigation module.

In operation, a NMEA sentence can be requested from the navigation module via a UART communication protocol as described above. Each character in an NMEA sentence is encoded as two hexadecimal characters (0-9, A-F), with the most significant nibble sent first. Sentences are terminated by a carriage return (<CR>) followed by a line feed (<LF>) sequence. NMEA 0183 takes the form of a series of ASCII comma delimited string, for example:

$GPGGA,123519,4807.038,N,01131.000,E,1,08,0.9,
545.4,M,46.9,M,*47

Thus, in some embodiments including the optional navigation module 196 and a memory 194, the electrical system 182 can collect location data (e.g., GPS data) and other data offline and in a cost-effective, efficient manner. For example, the location data can be used to verify the correct marking and remarking of one or more previously processed utility sites and/or to add to a global or other database of underground utility types and/or other locations, such as location of inventory, vehicles, or livestock for example.

Figure 4:
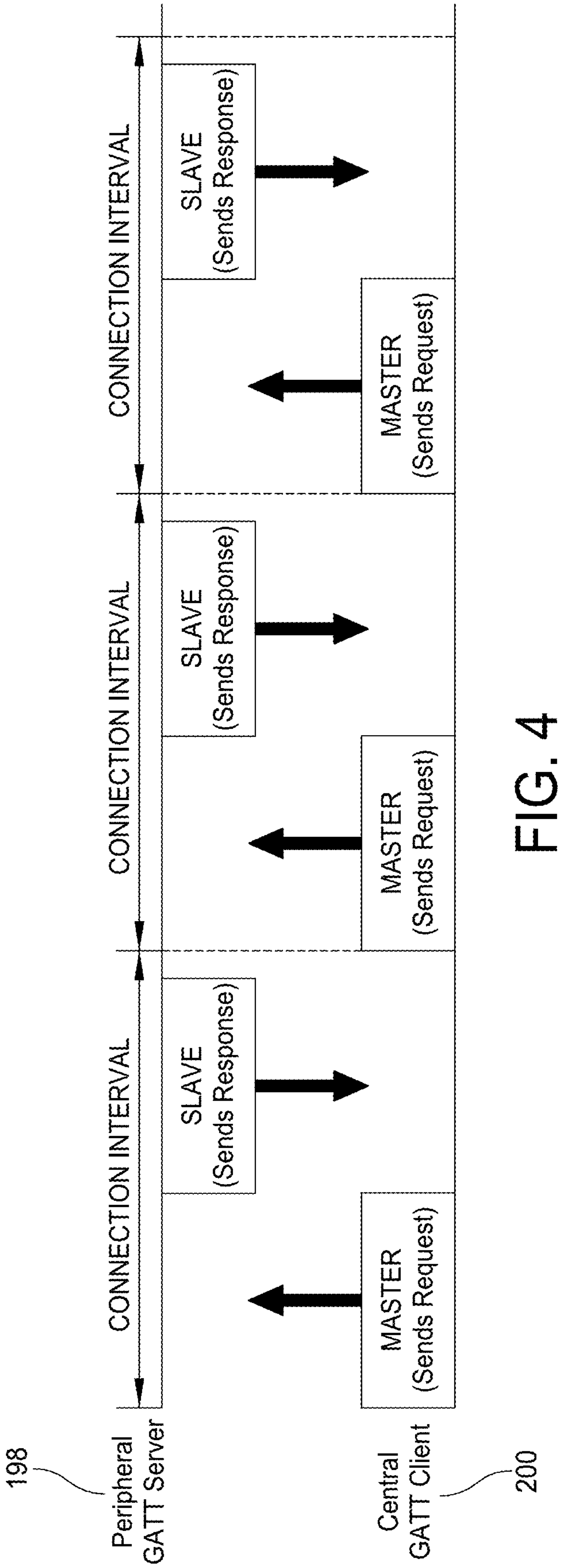
FIG. 4 illustrates an example data transaction between the marking stick or marking gun of FIGS. 1A and 2A and a computing device implementing a BLE GATT protocol.

Referring now to FIG. 4, in embodiments utilizing an included or separate navigation module 196 on separate smart device, a marking stick or gun can be a GATT server

198 and a computing device can be a GATT client 200. A GATT server or "peripheral" device 198 maintains data and service and characteristic definitions.

In a GATT transaction, the remote computing device (master) can send requests to the marking stick and the marking stick (slave) can respond by delivering a report. A request and a response can be understood as data transfers between a computing device and a marking stick. It should be appreciated that a request can also be a report (e.g., an output report) as described in the following explanation of data transfers and a marking stick may "announce" data without a request.

Typically, there are three types of data transfers: input, output, and feature data transfers, but other data transfer types may be implemented in embodiments of the present disclosure. Input reports (e.g., data, such as a trigger actuation for example, from a marking stick or gun to a separate computing device,) are normally sent from the marking stick or gun to the separate computing device, however there could be occasions where a separate computing device may set the value of an input report on a marking stick or gun. Output reports (e.g., data from the separate computing device to the marking stick or gun, such as '"computing device power on') are normally sent from the computing device to the marking stick; however, there are occasions where a separate computing device may read the value of an output report back from the marking stick. Feature reports may include data regarding configuration or specific applications in either direction.

As shown in FIG. 4, when establishing a connection, the marking stick or gun can suggest a 'Connection Interval' to the separate computing device, and the separate computing device may try to reconnect every connection interval to see if any new data is available. Typically, a connection interval for a GATT client-server connection can range from 7.5 milliseconds (ms) to 4 seconds(s), with a step size of 1.25 ms. The lowest connection interval that can be used depends on the device's capabilities. It should be appreciated that BLE is designed for devices that exchange small amounts of data periodically, which can conserve battery life while maintaining a connection.

In some embodiments, a BLE GATT connection may be made between a marking stick or gun and a separate computing device. Once a connection is established (e.g., with the connectGatt( ) method described infra), transactions between the marking stick or gun and the separate computing device may be enabled. Thus, within a transaction, the computing device can attempt to request data from the marking stick in intervals according to a connection interval. Upon a request, the marking stick or gun can send data (e.g., in the form of characteristic updates) as a response.

Optionally, a marking stick or gun of the present specification can collect data without communication to a separate computing device. For example, the marking stick or gun may collect data and store the data locally until communication with a computing device is established (e.g., via BLE GATT connection or any other suitable connection).

Figure 5:
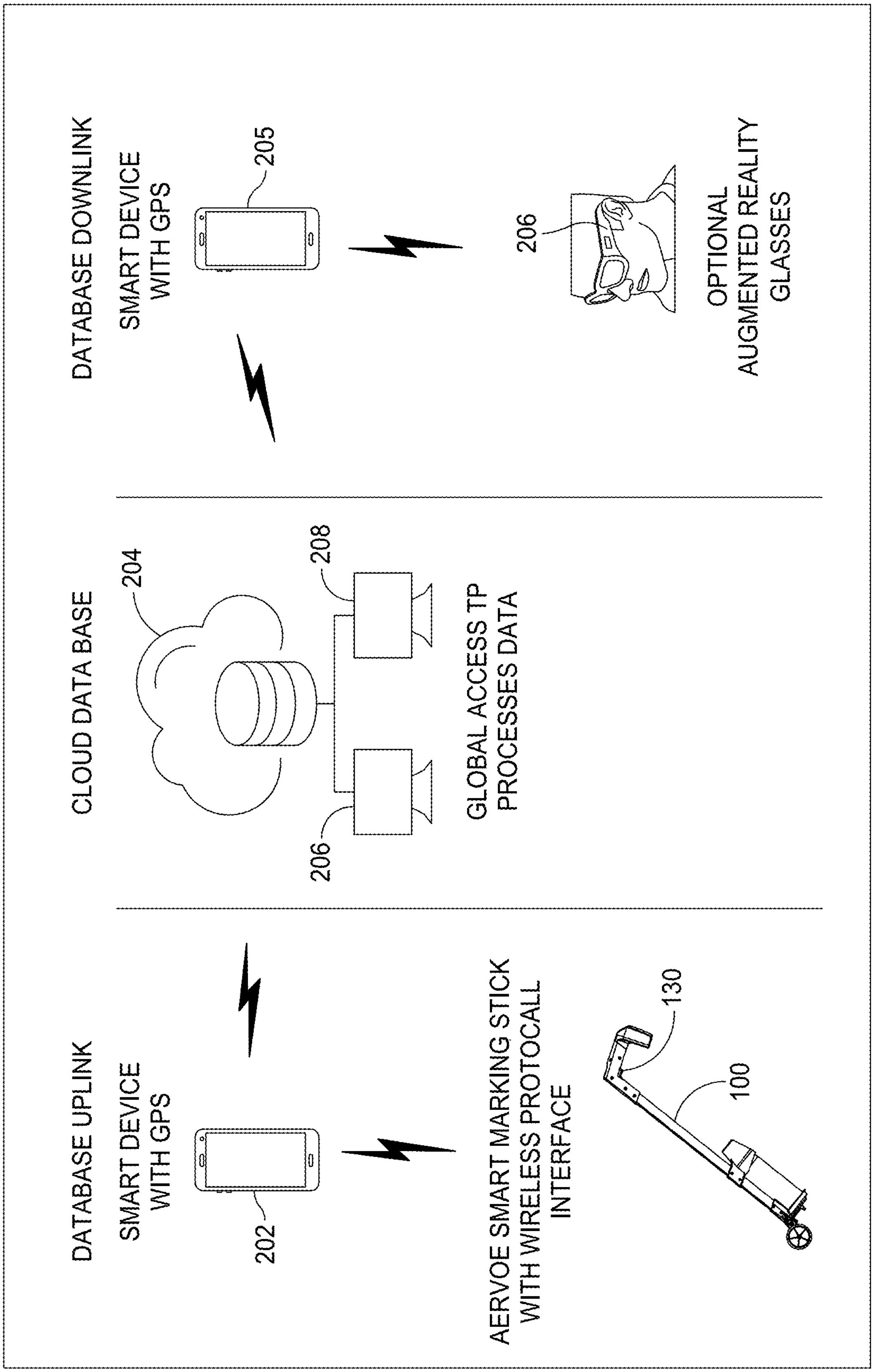
FIG. 5 illustrates a computing and communications network that includes a paint marking stick such as in FIG. 1 for example.

Turning now to FIG. 5, a portable marking stick 100 (or marking gun 154 as shown in FIG. 2A) may be provided with the electrical system 182 of FIG. 3. The marking stick 100 (or gun 154) can be in communication with a separate computing device 202 which can be located adjacent the marking stick 100 while the trigger switch 130 is depressed on the marking stick 100 (or gun 154). The computing device 100 can receive data from the marking stick 100 (or gun 154, via, for example, Bluetooth as described above), process the data, transmit the data, store the data, and/or display the data in any suitable form. Thus, the use of a computing device 202 is desirable in this application because it allows integration of other technologies, such GNSS, GPS, Garmin, Google Maps, LTE, Wi-Fi, Bluetooth, etc., while keeping the marking stick relatively simple because it does not require physical implementation of the other technologies on the marking stick itself.

The computing device 202 can include a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

As noted above, communication between the marking stick or gun and other system components (e.g., the separate computing device 202, a database, other user-device, etc.) can be facilitated via a wireless interface such as Bluetooth Low Energy ("BLE"). In some embodiments, a digital cellular telephone connection, Cellular Digital Packet Data (CDPD) connection, digital satellite data connection, or the like may be used to facilitate wireless communication. In some embodiments, a hardwired connection (e.g., a USB connection) between system components can be used to facilitate communication and data transfer.

In the embodiment of FIG. 5, the computing device 202 is in communication with a database 204 provided by one or more remote computing systems 206, 208. In some embodiments, the marking stick 100 can be directly connected to a separate computing device 202, which may having an associated database that stores data provided by the marking stick (or gun).

In the embodiment of FIG. 5, a user device, such as augmented reality glasses 206 may be incorporated into the overall system and in communication with the other system components. Other user devices, such as a smart watch or audible device, may be used to, for example, issue an audible sound according to proximity to marked line recorded with present marking stick or gun, such as a marked line including GPS location data for example.

Figure 6:
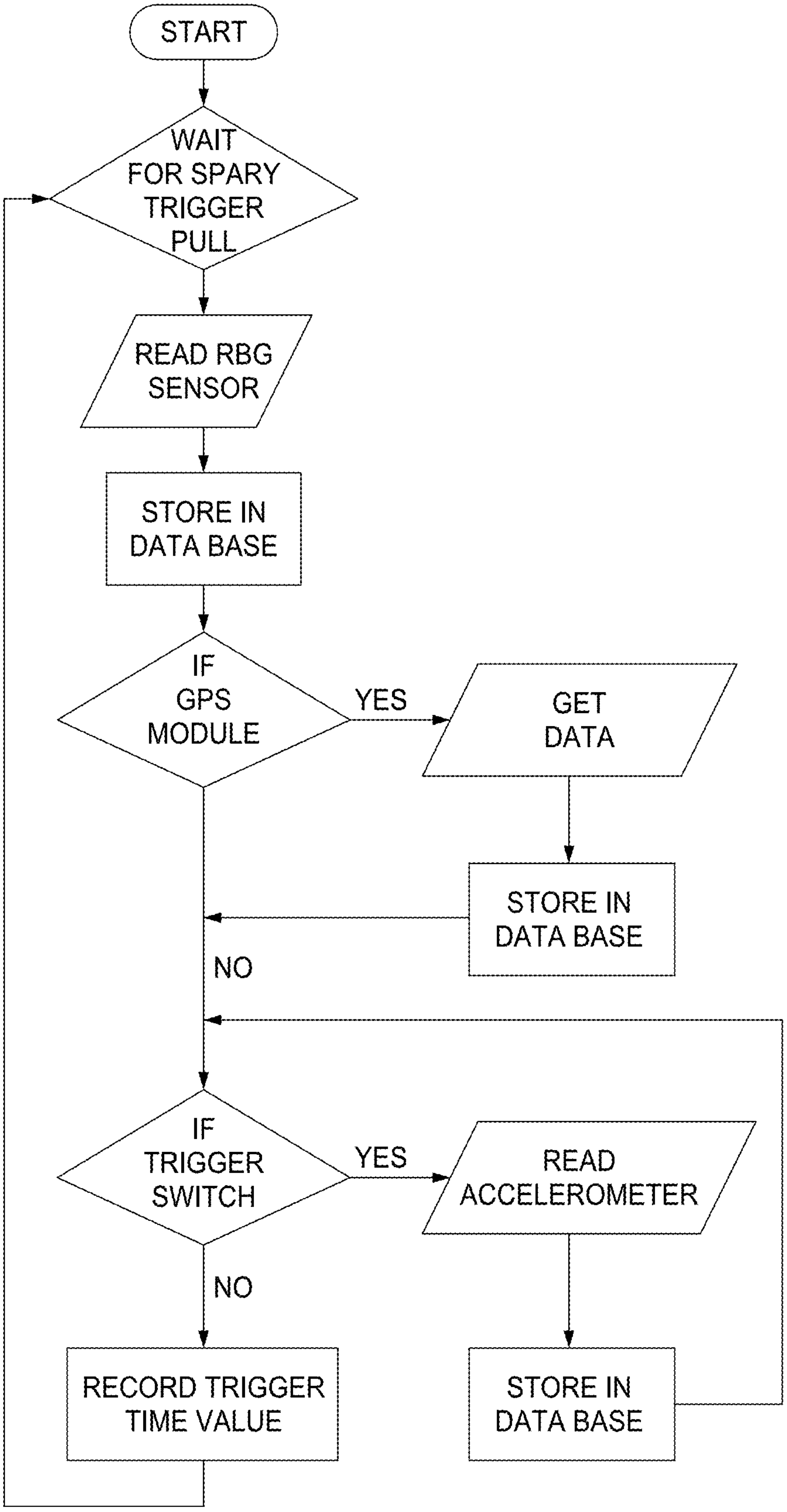
FIG. 6 is a block diagram for a custom remote application operating in conjunction with information provided by a peripheral device such as a applicator apparatus.

Turning to FIG. 6, the main system IC, such as the SOIC 180 of FIG. 3, can run a firmware application in which, at the Start step, the program is initialized (e.g., started). Initialization can be turning on the power to the system with an input switch, for example. In other embodiments, starting can be initiated in response to pulling the trigger on the marking stick. If an RFID tag is used, the system may initialize when the RFID tag is in proximity to an RFID transponder. Once the initialization is completed, the system may initiate a standby, low power mode, until an external event occurs such as another trigger pull, or the system may stay in a fully activated mode. In some embodiments, a Bluetooth Low Energy ("BLE") connection is established once the system is initialized or during the initialization process. In some embodiments, an IC with BLE protocol will control all the data exchange transactions and communications within the marking stick and with external computing and other data receiving or transmitting devices.

At the Wait Step, the electrical system waits for a spray trigger pull. Waiting can be monitoring a flag to determine if it indicates that a condition (e.g., a trigger pull) is met, for example. Any suitable sensor or connection can be used to sense a trigger pull. Once the trigger event occurs, the system will begin data acquisition. In some embodiments, a timer is started to track trigger actuation time.

At the Read RGB Step in the illustrated embodiment, once the electrical system identifies a trigger pull, an RBG sensor can collect color sensor data. Once color sensor data is collected, the RBG sensor can transmit the color sensor data to the appropriate destination, according to the specific embodiment, via communication circuitry. In other embodiments, an RFID tag may be used to identify a color, and the RFID signal or data can be sent to the appropriate destination.

At the first Store Step, the color sensor data is transmitted to and received/stored by a database. A database may be a company's on-premises physical servers or virtual servers as well as cloud infrastructure such as Amazon Web Services, Google Cloud, Azure, and the like. In other embodiments, the color sensor data could be transmitted and received/stored on or in association with the marking stick itself (such as in USB memory connectable to a USB port on the marking stick for example), or on a separate computing device like a phone or laptop, for example.

If a navigation module is included in marking stick or gun, at the Navigation Module Step, the flow chart will proceed to Get and second Store Steps. In these steps, location data from the navigation module will be retrieved and transmitted to the appropriate destination, according to the specific embodiment. In the embodiment illustrated in FIG. 5, the location data can be transmitted to and received/stored by a database 204 or by one or more separate computing devices, e.g., 202, 205.

Referring back to FIG. 6, if a navigation module is not included in the marking stick or gun, the flow chart can bypass the Navigation Module Step and proceed to the Trigger Switch Step. In the Trigger Switch Step of the embodiment of FIG. 3, the marking stick's trigger switch is monitored to determine whether the trigger is pulled. The trigger switch can be any suitable sensor to sense a trigger pull. The monitoring could be a conditional flag as described above (e.g., trigger flag=0 when the trigger is released and trigger flag=1 when the trigger is actuated). If a proper condition is met according to the specific embodiment (e.g., a trigger is actuated, trigger flag=1, etc.), the system can proceed to the Read Accelerometer Step. If the proper condition is met according to the specific embodiment (e.g., the trigger is released, causing trigger flag=0), the system can proceed to the Record Trigger Release Step. Other monitoring methods are envisioned, with the foregoing method serving as an example.

At the Read Accelerometer Step, an accelerometer, such as a part of the motion interface sensor 184 of FIG. 3, can collect motion sensor data. Once motion sensor data is collected, the accelerometer can transmit the motion sensor data to the appropriate destination, according to the specific embodiment, via communication circuitry.

At the third Store Step, the motion sensor data is transmitted to and received/stored by a database. A database may be a company's on-premises physical servers or virtual servers as well as on-cloud infrastructure such as Amazon Web Services, Google Cloud, Azure, and the like. In other embodiments, the motion sensor data can be transmitted and received/stored by a computing device like a phone or laptop, for example. After the data is stored in the appropriate location, the system can proceed back to the Wait Step, where a trigger switch in the marking stick is monitored.

At the Trigger Switch Step, the electrical system can record a trigger time value once the trigger is released. The trigger duration data will be sent to the appropriate destination, such as a database or computing device. The firmware program will then return to the Wait Step and start the process over again. If a user desired to stop using the marking stick or gun, the electrical system can be shut down by a power switch, for example, as shown in FIG. 3.

Alternatively, one or more of the firmware Steps of FIG. 6 may be conducted simultaneously, in a different order, or not at all. Furthermore, there may be additional steps, such as processing steps, that may occur within a different embodiment.

Figure 7:
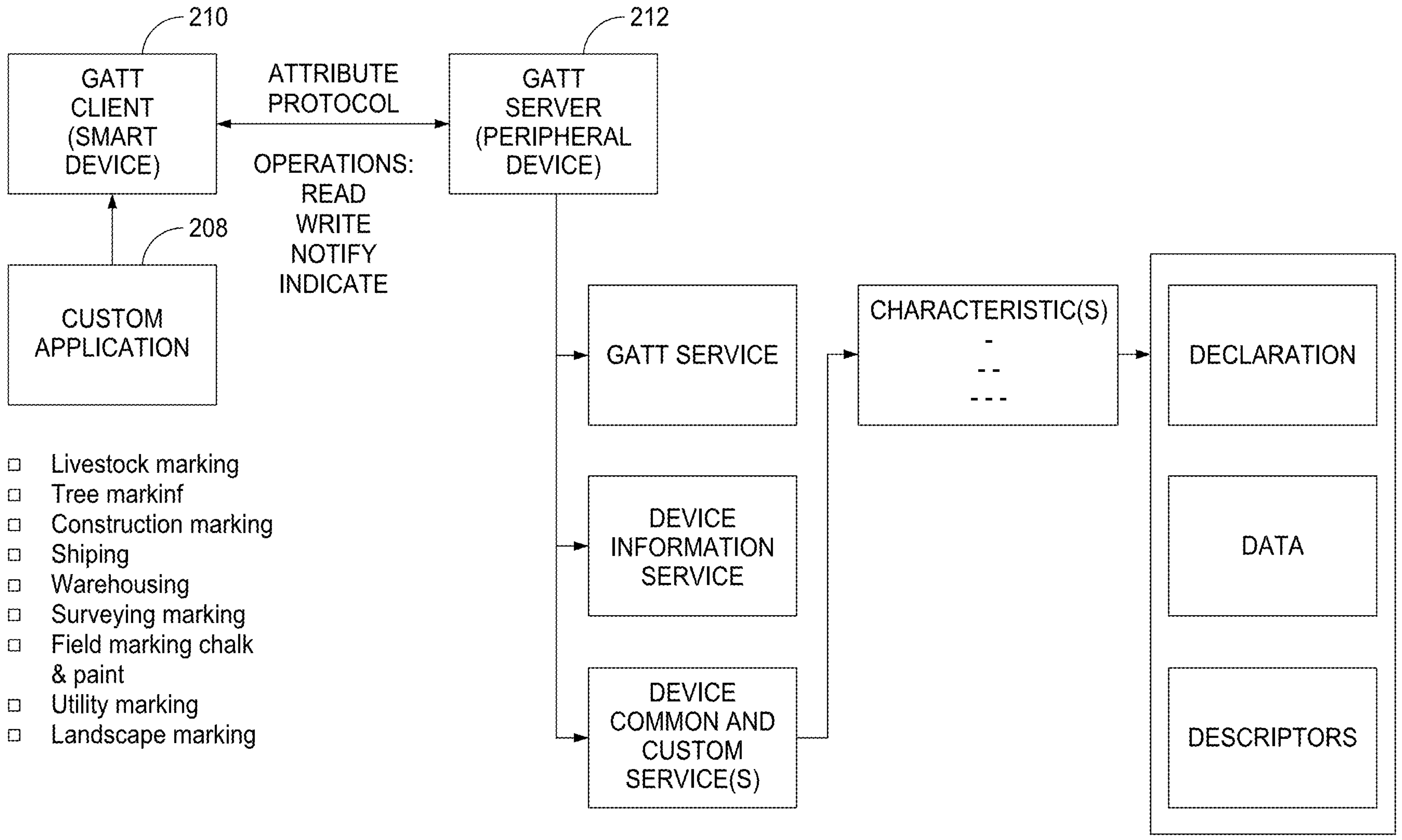
FIG. 7 is a flow chart of a firmware application that runs on the SOIC of FIG. 3.

Referring now to FIG. 7, one or more custom applications 208 can be run on the separate computing device client 210 as described above. Such information collected via the inter-cooperation of marking stick or gun server 212 and computing device client 210 can include, for example, (a) livestock marking, (b) tree marking, (c) construction marking, (d) shipping, (e) warehousing (such as warehousing facility or inventory location for example), (f) surveying marking, (g) chalk and paint field marking, (h) utility marking, and (i) landscape marking data.

The marking stick or gun 212 thus communicates data to the separate client device 210 and its associated application (s) 208. The server device 212 can advertise when a marking stick of gun event occurs (e.g., a trigger pull). Once such an event occurs, the client device 208 can receive or request data from the marking stick or gun server device 212 as the client application 208 may dictate or as the server device 212 may dictate in some embodiments.

By using this interface methodology (e.g., BLE GATT), one skilled in the art of writing application programs for Windows PC, Mac, Chromebook, Android tablet, Smart Phone, etc. can provide an application specific programs using any combination of the device's sensors and user actions to gather useful data about marking activities that take place with the marking stick or gun. The open architecture and universal interface attributes of the current disclosure provide a simple way to audit, record, geo-tag, time stamp, etc., spray-painting activity with the present marking or gun. While GATT was chosen for this descriptive embodiment because it illustrates the functionality and the utilization of the onboard sensors in an effective manner, it should be appreciated that there are other methods that can be used. For example, a UART emulation service interface or BLE ATT may be used.

The BLE GATT and ATT protocol is responsible for managing data storage and communication between devices. The protocol provides a means for the server device to store data in a format (e.g., attribute data structure) that the client device can read and write, as well as provide mechanisms for the client device to access, write, and read that data.

An attribute protocol enables data exchange between a server device and a client device. The protocol also provides a set of operations, namely, how to query, write, indicate, or notify the data and/or control information between the two GATT parties.

In some embodiments when the marking stick or gun is implemented as a server device, the server device may be operated as a Human Interface Device ("HID") or a peripheral device. For context, common examples of HIDs are a computer mouse, a keyboard, a joystick, a IoT temperature sensor, etc. which can serve as a server device using an industry standard Bluetooth Low Energy ("BLE") GATT Peripheral Interface. Using the HID standard simplifies the installation and compatibility of input devices across different operating systems and applications. For example, in some embodiments the system firmware uses sensor data from one or more accelerometers and/or one or more gyroscopes to emulate x-direction, y-direction, z-direction movements, combined with a trigger switch acting like a button on a convention prior art mouse. The server device can optionally implement an air mouse emulator system to sense movement and generate and report movement information.

With reference back to FIG. 3, the battery and power system 189 can be used to report characteristics associated with a marking device's battery. Characteristics may include, for example, a battery critical status, a battery energy status, and a battery health status. Battery energy status may be used to describe quantitative information of a battery (e.g., capacity in kilowatt-hour) represented by an instance of the Battery Service. When read, the battery energy status characteristic returns the current energy status details of the battery. Battery critical status can aggregate state information indicating that the marking device may no longer function as expected due to low energy or service required. When read, the Battery critical status characteristic may return status bits related to potential battery malfunction. Battery health status may be used to describe several dynamic aspects of battery health for an instance of the battery service.

For example, a sample report provided by the battery service as follows:

```
struct battery_report_t
{
uint8_t battery_critical;
uint8_t battery_energy;
int8_t battery_health;
}
```

In some embodiments, the marking stick or gun can include a Human Interface Device ("HID") service. The format of the characteristic value may be fully inherited by the HID Class specification. In some embodiments, the HID service report characteristics may be like that of a 3-D air mouse emulator's report characteristics. For example, a report provided by the HID service could be structured as follows:

```
struct HID_report_t
{
uint8_t buttons;
int8_t x;
int8_t y;
int8_t z;
}
```

In some embodiments incorporating a motion interface via a HID service as described above, the motion interface can include a 3-dimensional motion tracking IC with one or more accelerometers and one or more gyroscopes to collect x, y and z positional data over time, suitable to being stored in a 3-dimensional array.

Similarly, the marking stick or gun can include, as shown in FIG. 3, an RBG sensor 188. Characteristics provided by the RGB sensor 188 can include sensor ON, sensor READ, sensor OFF, for example. An RBG value may be allocated using any suitable format. For example, in a 24-bit format, red, green, and blue are each allocated 8 bits where bits 23-16, 15-8, and 7-0 are assigned respectively. For example, a report provided by the RGB sensor 188 can be structured as follows:

```
struct RBG_report_t
{
uint8_t sensor_ON;
uint8_t sensor_READ;
int32_t sensor_VALUE;
uint8_t sensor_OFF;
}fig
```

As also shown in FIG. 3, the marking stick or gun electrical system 182 can include SOIC-provided trigger switch service reporting characteristics regarding the state of the marking device's trigger switch 192. Such characteristics can include trigger PULL, trigger RELEASE, and trigger DURATION, among others. For example, a report provided by the spray trigger service could be structured as follows:

```
struct trigger_report_t
{
uint8_t trigger_PULL;
uint8_t trigger_RELEASE;
uint8_t trigger_DURATION;
}
```

When the marking stick or gun includes the optional GPS module 196, Table 1 below identifies GPS-module-related location characteristics that can be provided by the optional GPS service provided by the GPS module 196.

TABLE 1

| Name Or Field | Example | Description |
|---|---|---|
| Message ID | $GPGGA | GGA protocol header |
| UTC time | 161229.487 | hhmmss.sss |
| Latitude | 3723.2475 (37 degrees, 23.2475 minutes) | ddmm.mmmm |
| N/S Indicator | N | N = North, S = South |
| Longitude | 12158.3416 (121 degrees, 58.3416 minutes) | dddmm.mmmm |
| E/W indicator | W | E = East or W = West |
| Position Fix Indicator | 1 | |
| Satellites used | 07 | Range is 0 to 12 |
| HDOP | 1.0 | Horizontal Dilution of Precision |
| MSL Altitude | 9.0 | Meters |

As noted above, interacting with an embodiment of a marking stick or gun incorporating the BLE GATT methodology can include connecting to the marking device's GATT server. To connect to a GATT server on a marking stick or gun, the connectGatt( ) method can be used. This method implements three parameters:

- a Context object (usually the application context);
- a boolean value (e.g., autoConnect) indicating whether to automatically connect to the server device as soon as it becomes available; and
- a reference to a BluetoothGattCallback, which is used to deliver results to the client (e.g., a client device application), including connection status and further GATT client operations.

Figure 8:
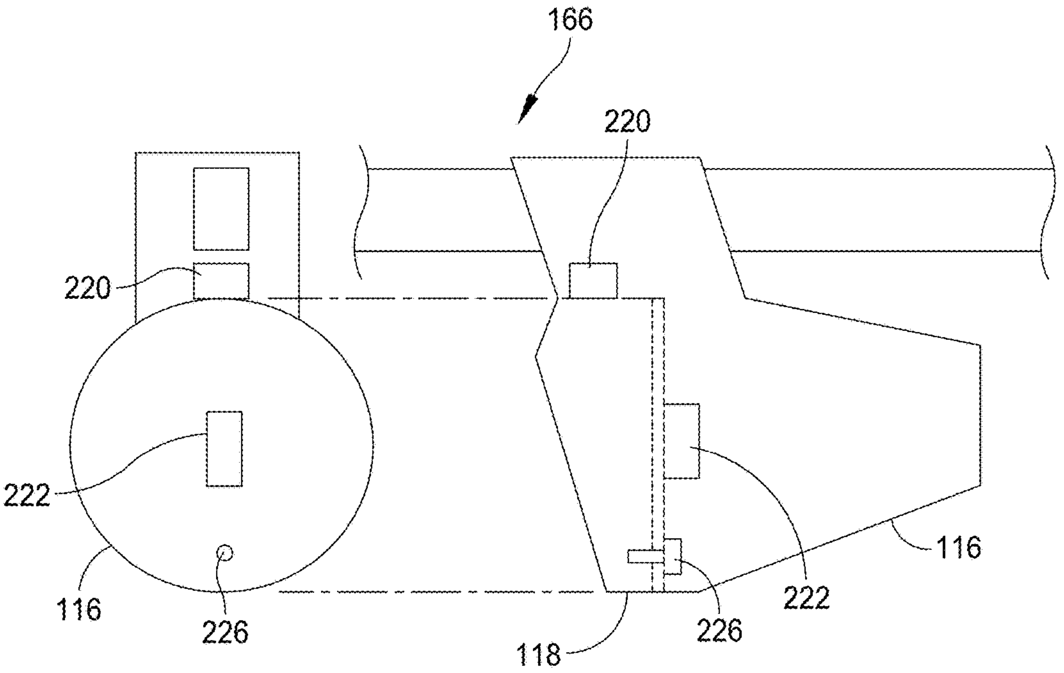
FIG. 8 shows (i) on the right segment, a partially cross-sectional view of the upper end of the paint cartridge mount on the marking stick of FIG. 1, and (ii) on the left segment, a bottom plan view of the upper end of the paint cartridge mount.
Figure 9:
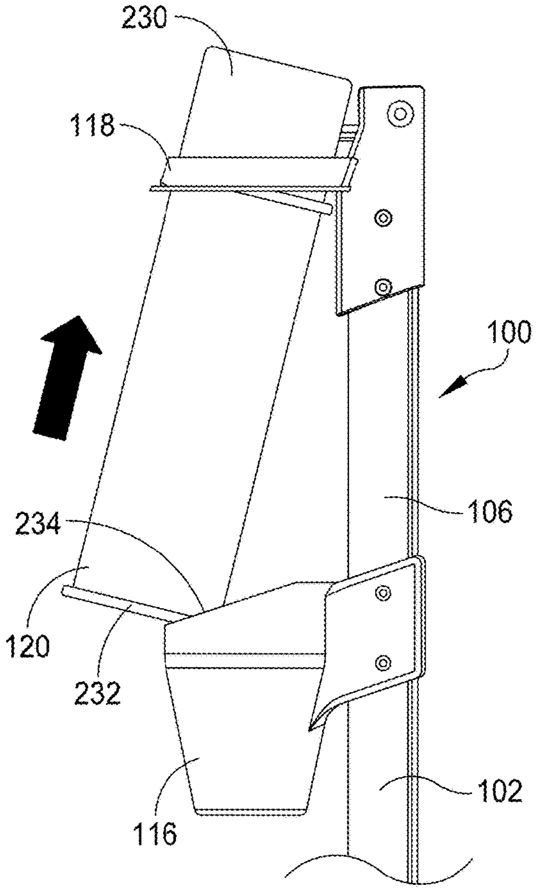
FIG. 9 shows the initiation step of the method of mounting a paint can cartridge in the paint cartridge mount of FIG. 8.

With reference now to FIG. 9, the paint cartridge mount 160 includes an RGB color sensor 220 in communication with, as shown in FIG. 3, the color identification module 188 and is mounted within the upper cartridge frusto-connical cap 116 to be adjacent color on a paint can cartridge (not shown in FIG. 8) when mounted in the paint cartridge mount 160. The color sensor 220 can be used to collect data regarding the color of the marking material (e.g., paint) in the adjacent paint can cartridge.

An RFID transponder 222 can be mounted in the axial center 224 of the upper cartridge frusto-connical cap 116 and also be in communication with, as shown in FIG. 3, the RFID identification module 188. The RFID transponder 222 also can be used to identify the color of the marking material (e.g., paint) in the associated paint can cartridge.

A container sensor 226 also may optionally be mounted in the cartridge retaining cap 118 to identify when a container is mounted in the upper cartridge frusto-connical cap 116. The container sensor 226 can be a pushbutton switch that is actuated when a marking material (e.g., paint) container is fully seated, for example. Any other suitable switch may be used for such a sensing application, such as, for example, an optical switch. The container sensor 226 may be included in communication with the color identification module 188, which may relay container sensed information to the SOIC 180 as shown in FIG. 3.

Figure 10:
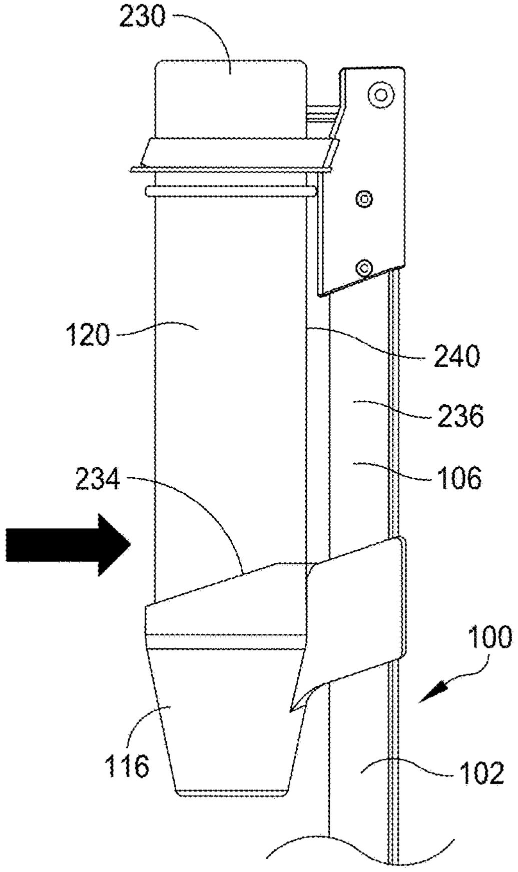
FIG. 10 shows the paint can cartridge mounted in the paint cartridge mount of FIG. 8.
Figure 11:
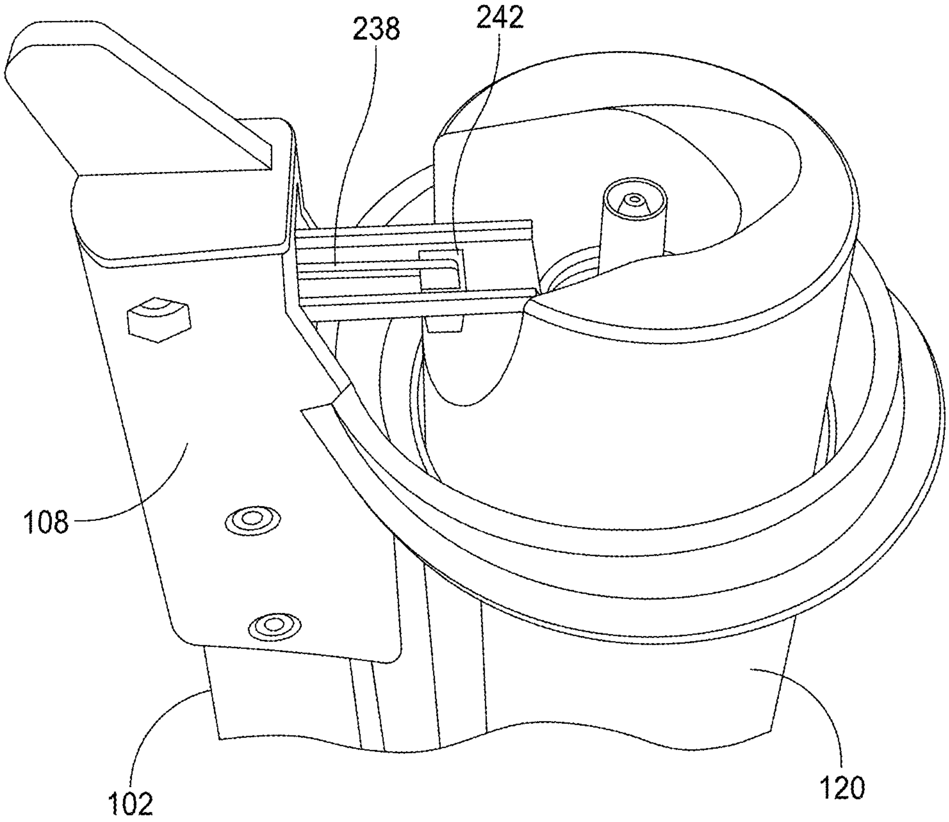
FIG. 11 is a perspective view of the bottom end of the paint cartridge mount of Figure with a paint can cartridge mounted in the bottom end so that cartridge retention spring engages a mating depression in the cap of the paint can cartridge and a paint spray actuator is adjacent the paint spray tip extending from the paint can cartridge.

With reference now to FIGS. 9, 10, and 11, the paint can cartridge 120 is manually mounted within the cartridge mount section 106 on the marking stick 100 by inserting the paint cartridge spraying end 230 into and through the lower cartridge retaining ring 118 to have the paint cartridge bottom end 232 located slightly above the lower edge 234 of the upper frusto-conical cap 116 in the cartridge mount section 106. Next, move the paint cartridge bottom end 232 toward the laterally extending stick portion 236 of cartridge mount section 106. The paint can cartridge 120 then will be secured in position within the cartridge mount section 106 by the spring arm 238 that extends from lower end section 108 of the central stick section 102 to abut and bias the paint cartridge spraying end 230, so that the paint can cartridge 120 fully seats within the upper frusto-conical cap 116 with tubular paint cartridge sidewall 240 parallel to the central stick section 102. In order to remove the paint can cartridge 120 form the cartridge mount section 106, reverse the steps for mounting recited above.

With reference to FIG. 11, the spring arm 238 also penetrates a spring slot 242 in a spray activation arm 240 that also extends transversely from the lower end section 108 of the central stick section 120. The user's pulling of, as shown in 1B, the trigger switch 130 causes the spray activation arm 240 to push toward and activate the spray tip 142 on the paint can cartridge 120 within a concave spray tip depression or cup section 244 in the paint cartridge spraying end 230.

Figure 12:
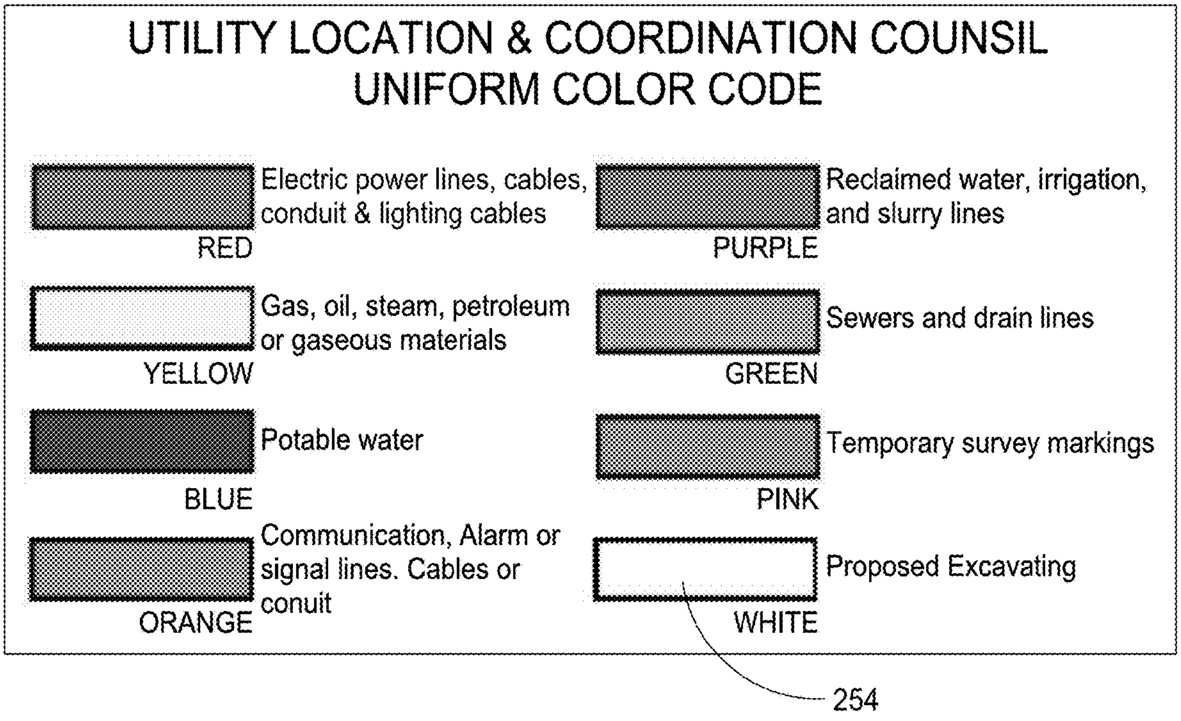
FIG. 12 is the Utility Location &Coordination Council's Uniform Color Code chart.
Figure 13:
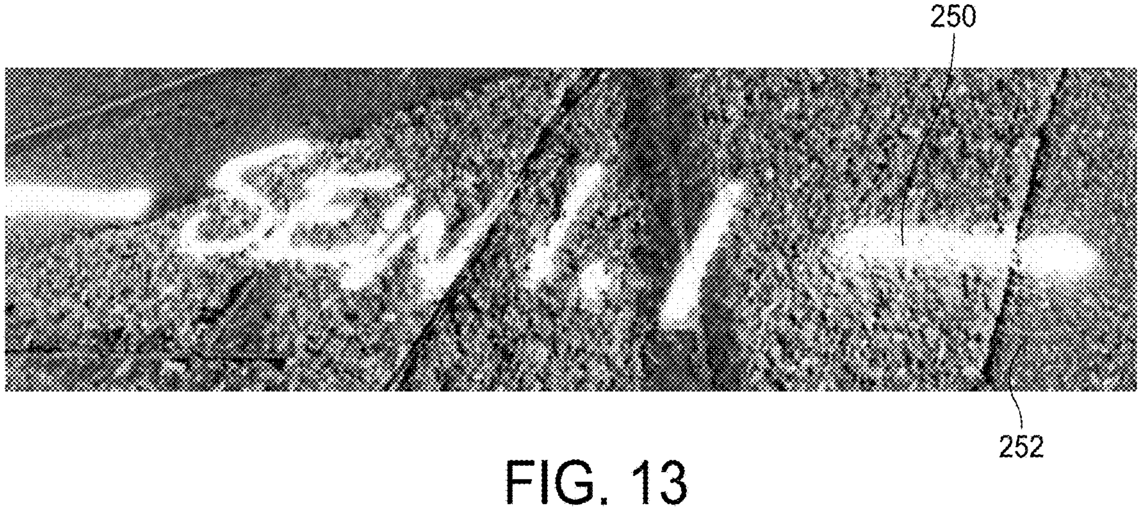
FIG. 13 is a white spray paint marking script on ground structure applied by the marking stick of FIG. 1A.
Figure 14:
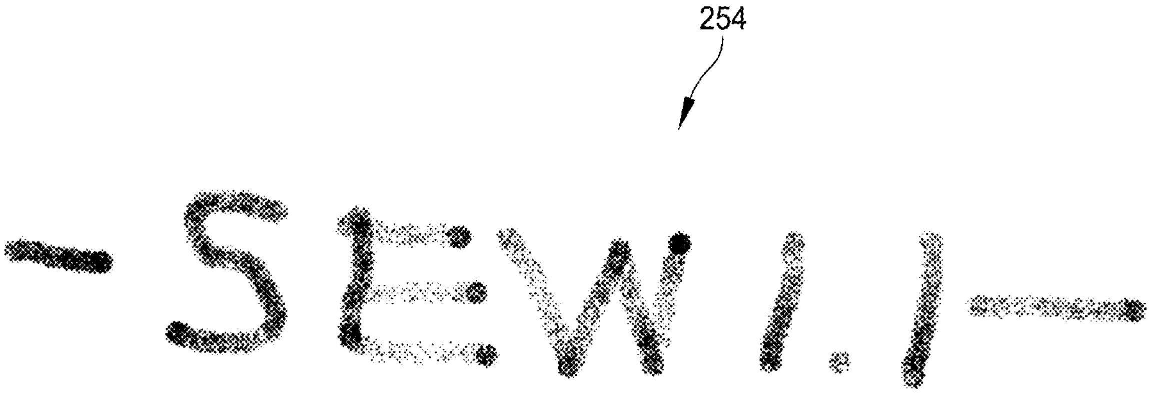
FIG. 14 is a physical representation of the recorded digital facsimile information provided by the marking stick of FIG. 1A.

With reference now to FIGS. 3 and 12, in some embodiments of the electrical system 182, the color sensor or RFID transponder 188 can identify Utility Location and Coordination Uniform Color Codes as set forth in FIG. 12. With reference to FIGS. 12, 13, and 14, the marking stick or gun of this specification can be activated to cause a spray can cartridge mounted in the marking stick or gun (not shown in FIGS. 12, 13, and 14) to spray, for example, white paint indicia 250 on a ground surface 252 indicating the location for proposed excavation as identified for white paint 254 in FIG. 12.

FIGS. 13 and 14 illustrate an example application of the present marking stick or gun whereby the associated "-SEW 1.1-" 250 sprayed on the ground surface 252 with the marking stick or gun. When activated by pulling of the trigger on the marking stick or gun, the electrical system 182 as shown in FIG. 3 can collect marking stick sensor data 254 indicative of this marking 250 using the various sensors disclosed in this application (e.g., accelerometer, gyroscopes, RBG sensor, etc.). Thus, with an embodiment incorporating a motion interface, physical motion of the marking stick can be transduced by the electrical system 182 such as shown in FIG. 3 (or by use of the marking stick or gun in conjunction with a separate GPS system provided by a separate smart device as described above) into digital motion sensor data, which can then be stored, transmitted, processed, or erased as required by any suitable application.

Thus, for example, a computing device can be in communication with the marking stick via a BLE GATT connection. Via such a BLE GATT connection, the marking stick can transmit data to the computing device as described in the current disclosure. Once a computing device receives data from the marking stick, the computing device can process the data as required by a specific custom application. CLAIMS.

Referring back to FIG. 1A, the marking stick 100 can be lightweight and easily portable and manually manipulated during use, such as weighing between 1 and 10 pounds, and for example about 2 pounds, and having a lateral length LS of between 12 and 50 inches, and for example approximately 33 inches. Similarly, with reference to FIG. 2B, the marking gun can be lightweight, portable, and easily manually manipulated, such as weighing between 0.4 and 5 pounds, and for example about 1 pound, and having a length from top to bottom of the gun LG of 4 to 20 inches, and for example about 7 inches.

The foregoing detailed description has described some specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to thereby enable others skilled in the art to best utilize the present systems, their components, and methods and various embodiments with various modifications as may be suited to the particular use contemplated.

For example, in some applications the applicator stick or gun may not have paint spray apparatus, and in other applications the composition to be mounted on and/or sprayed with the stick or gun may be other than paint.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Unless otherwise indicated, all numbers or expressions, such as those expressing dimensions, physical characteristics, and the like, used in the specification (other than the claims) are understood to be modified in all instances by the term "approximately."

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method of providing marking information regarding portable, hand-held marking device use without having a GPS location determination system on the portable, hand-held marking applicator, the method comprising:

with the portable, hand-held marking applicator, activating the marking device to eject a marking composition onto a separate surface;

with an air mouse motion sensor on the portable, hand-held marking applicator, sensing motion information regarding motion of the portable hand-held marking device during the activation step;

transmitting from the portable, hand-held marking applicator the motion information to a remote smart computing device.

2. The method of providing marking information of claim 1 wherein the portable, hand-held applicator is a marking stick having opposed first and second end sections, an activation trigger adjacent the first end section, a removable marking composition container mounting section extending intermediate the opposed first and second end sections, and a marking composition ejection section adjacent the second end section on the marking stick.

3. The method of providing marking information of claim 2 wherein the method further comprises:

with a marking composition container identification module on the portable, hand-held marking applicator, identifying a color of a marking composition in the marking composition container; and with the information transfer facility, supporting transfer of the color of the marking composition to a remote device.

4. The method of providing marking information of claim 1 wherein the portable, hand-held applicator is a marking gun having an activation trigger, a removable marking composition container mounting section, and a marking composition ejection section.

5. The method of providing marking information of claim 4 wherein the method further comprises:

with a marking composition container identification module on the portable, hand-held marking applicator, identifying a color of a marking composition in the marking composition container; and with the information transfer facility, supporting transfer of the color of the marking composition to a remote device.

6. The method of providing marking information of claim 1 wherein the method further comprises:

with a marking composition container identification module on the portable, hand-held marking applicator, identifying a marking composition in the marking composition container.

7. The method of providing marking information of claim 6 wherein the method further comprises:

with a marking composition container identification module on the portable, hand-held marking applicator, identifying a color of a marking composition in the marking composition container; and with the information transfer facility, supporting transfer of the color of the marking composition to a remote device.

8. The method of providing marking information of claim 2 wherein the method further comprises:

with a marking composition container identification module on the portable, hand-held marking applicator, identifying a marking composition in the marking composition container.

9. The method of providing marking information of claim 8 wherein the method further comprises:

with a marking composition container identification module on the portable, hand-held marking applicator, identifying a color of a marking composition in the marking composition container; and with the information transfer facility, supporting transfer of the color of the marking composition to a remote device.

10. The method of providing marking information of claim 4 wherein the method further comprises:

with a marking composition container identification module on the portable, hand-held marking applicator, identifying a marking composition in the marking composition container.

11. The method of providing marking information of claim 10 wherein the method further comprises:

with a marking composition container identification module on the portable, hand-held marking applicator, identifying a color of a marking composition in the marking composition container; and with the information transfer facility, supporting transfer of the color of the marking composition to a remote device.

12. The method of providing marking information of claim 1 wherein the method further comprises:

with a marking composition container identification module on the portable, hand-held marking applicator, identifying a color of a marking composition in the marking composition container; and with the information transfer facility, supporting transfer of the color of the marking composition to a remote device.

* * * * *